United States Patent
Dang et al.

(10) Patent No.: US 11,014,509 B2
(45) Date of Patent: May 25, 2021

(54) MOUNT FOR HOLDING A MOBILE ELECTRONIC DEVICE

(71) Applicant: mophie inc., Irvine, CA (US)

(72) Inventors: Dat Minh Dang, Westminster, CA (US); Nguyen To, Corona, CA (US)

(73) Assignee: MOPHIE INC., Irvine, CA (US)

( * ) Notice: Subject to any disclaimer, the term of this patent is extended or adjusted under 35 U.S.C. 154(b) by 155 days.

(21) Appl. No.: 16/274,967

(22) Filed: Feb. 13, 2019

(65) Prior Publication Data

US 2020/0254940 A1    Aug. 13, 2020

(51) Int. Cl.
| | | |
|---|---|---|
| *B60R 11/02* | (2006.01) | |
| *F16H 19/04* | (2006.01) | |
| *F16B 2/22* | (2006.01) | |
| *H02J 7/02* | (2016.01) | |
| *F16B 2/12* | (2006.01) | |
| *B60R 11/00* | (2006.01) | |

(52) U.S. Cl.
CPC ...... *B60R 11/0252* (2013.01); *B60R 11/0241* (2013.01); *F16B 2/12* (2013.01); *F16B 2/22* (2013.01); *F16H 19/04* (2013.01); *H02J 7/025* (2013.01); *B60R 2011/0008* (2013.01); *B60R 2011/0059* (2013.01); *B60R 2011/0071* (2013.01)

(58) Field of Classification Search
CPC ... B60R 11/0252; B60R 11/0241; H02J 7/025
USPC ........................................................ 320/108
See application file for complete search history.

(56) References Cited

U.S. PATENT DOCUMENTS

| | | |
|---|---|---|
| D277,662 S | 2/1985 | Huntington et al. |
| 5,039,929 A | 8/1991 | Veistroffer et al. |
| D345,728 S | 4/1994 | Tyneski et al. |
| D350,540 S | 9/1994 | Hyvonen |
| D361,069 S | 8/1995 | Hellier et al. |
| D369,344 S | 4/1996 | Lindeman et al. |
| D379,463 S | 5/1997 | Richter |
| 5,788,202 A | 8/1998 | Richter |
| D405,453 S | 2/1999 | Richter |
| D406,591 S | 3/1999 | Richter |

(Continued)

FOREIGN PATENT DOCUMENTS

| | | |
|---|---|---|
| JP | 1379870 | 2/2010 |
| KR | 10-2004-0093848 | 11/2004 |

(Continued)

OTHER PUBLICATIONS

Oliver Haslam, "Mophie Unveils New Wireless Charging Mount, Stand, and Powerbank", Redmond Pie, posted Sep. 1, 2018 (accessed Sep. 9, 2019), URL: https://www.redmondpie.com/mophie-unveils-new-wireless-charging-mount-stand-and-powerbank/.

(Continued)

*Primary Examiner* — Jerry D Robbins
(74) *Attorney, Agent, or Firm* — Knobbe, Martens, Olson & Bear, LLP (57) ABSTRACT

A mount for holding a mobile electronic device can have a main body, a pair of movable arms that can hold the mobile electronic device, and a pair of stationary arms. The stationary arms can provide a stable object to press against for enable one-handed operation of the mount while reducing force transfer to the mounting mechanism or underlying mounting structure.

29 Claims, 8 Drawing Sheets

(56) References Cited

U.S. PATENT DOCUMENTS

| | | |
|---|---|---|
| D411,544 S | 6/1999 | Richter |
| D413,097 S | 8/1999 | Chang |
| 5,946,637 A | 8/1999 | Umbach et al. |
| D413,607 S | 9/1999 | Lindahl |
| D442,939 S | 5/2001 | Goldenburg |
| D458,266 S | 6/2002 | Herath |
| D460,446 S | 7/2002 | Hughes et al. |
| D463,361 S | 9/2002 | Ruohonen |
| D501,205 S | 1/2005 | Quinn |
| D520,447 S | 5/2006 | Liu |
| D529,905 S | 10/2006 | Richter |
| D530,713 S | 10/2006 | Richter |
| D533,499 S | 12/2006 | Suzuki |
| D535,614 S | 1/2007 | Majanen et al. |
| 7,158,092 B2 | 1/2007 | Shen |
| D545,614 S | 7/2007 | Majanen et al. |
| D566,118 S | 4/2008 | Brassard |
| D566,590 S | 4/2008 | Stevens et al. |
| D570,836 S | 6/2008 | Chen |
| D585,897 S | 2/2009 | Carnevali |
| 7,492,579 B2 | 2/2009 | Homer et al. |
| D592,188 S | 5/2009 | Huang |
| 7,532,466 B2 | 5/2009 | Kobayashi et al. |
| 7,542,052 B2 | 6/2009 | Solomon et al. |
| D602,913 S | 10/2009 | Han et al. |
| D605,588 S | 12/2009 | Nomi et al. |
| D608,350 S | 1/2010 | Bo |
| D614,613 S | 4/2010 | Kim et al. |
| D620,931 S | 8/2010 | Opman |
| D623,132 S | 9/2010 | Yano |
| D623,638 S | 9/2010 | Richardson et al. |
| D623,639 S | 9/2010 | Richardson et al. |
| D625,729 S | 10/2010 | McNames et al. |
| D626,439 S | 11/2010 | Lee et al. |
| D626,541 S | 11/2010 | Kim et al. |
| D626,964 S | 11/2010 | Richardson et al. |
| D629,315 S | 12/2010 | McAlpine et al. |
| D629,355 S | 12/2010 | Bodley et al. |
| D634,304 S | 3/2011 | Andre et al. |
| D638,414 S | 5/2011 | Magness et al. |
| D639,286 S | 6/2011 | Mohoney |
| D639,816 S | 6/2011 | Bau |
| D640,707 S | 6/2011 | Yeh |
| D643,030 S | 8/2011 | Cheng et al. |
| D643,423 S | 8/2011 | Smith et al. |
| D643,433 S | 8/2011 | Hsieh et al. |
| D645,033 S | 9/2011 | Quong et al. |
| D646,315 S | 10/2011 | Orf |
| D647,907 S | 11/2011 | Perry et al. |
| D648,339 S | 11/2011 | O'Neil et al. |
| D650,774 S | 12/2011 | Molter |
| D656,930 S | 4/2012 | Son |
| D656,932 S | 4/2012 | Wikel |
| D657,741 S | 4/2012 | Fahrendorff et al. |
| D660,794 S | 5/2012 | Fahrendorff et al. |
| D662,470 S | 6/2012 | Smith et al. |
| 8,240,628 B2 | 8/2012 | Huang |
| 8,295,652 B1 | 10/2012 | Newstead |
| D670,703 S | 11/2012 | Hasbrook et al. |
| D671,950 S | 12/2012 | Richter |
| D674,397 S | 1/2013 | Asher |
| 8,369,082 B2 | 2/2013 | Madonna et al. |
| D682,780 S | 5/2013 | Brown |
| D684,980 S | 6/2013 | Chun |
| D685,321 S | 7/2013 | Smith et al. |
| D685,380 S | 7/2013 | Richter |
| D690,707 S | 10/2013 | Minn et al. |
| D696,241 S | 12/2013 | Paugh et al. |
| D696,259 S | 12/2013 | Howarth et al. |
| 8,616,327 B1 | 12/2013 | Palacios |
| D697,515 S | 1/2014 | Adelman et al. |
| D703,657 S | 4/2014 | Carnevali |
| D704,199 S | 5/2014 | Byun |
| D705,211 S | 5/2014 | Huang |
| 8,724,837 B2 | 5/2014 | Crooijmans et al. |
| D707,673 S | 6/2014 | Lan |
| D709,066 S | 7/2014 | Byun |
| D712,394 S | 9/2014 | Booth et al. |
| D713,398 S | 9/2014 | Alesi et al. |
| D717,307 S | 11/2014 | Chun |
| D721,649 S | 1/2015 | Tsai |
| D722,056 S | 2/2015 | Nguyen et al. |
| D726,175 S | 4/2015 | Tsai et al. |
| 9,004,434 B2 | 4/2015 | Kang et al. |
| D750,633 S | 3/2016 | Minn et al. |
| D752,571 S | 3/2016 | Richter |
| 9,274,556 B2 | 3/2016 | Gallouzi et al. |
| D766,908 S | 9/2016 | Richter |
| D767,556 S | 9/2016 | Lee |
| D772,218 S | 11/2016 | Alesi et al. |
| D778,714 S | 2/2017 | McSweyn et al. |
| D780,168 S | 2/2017 | Du |
| D782,462 S | 3/2017 | Huang |
| D783,592 S | 4/2017 | Ju |
| D783,593 S | 4/2017 | Chen |
| D784,923 S | 4/2017 | Song |
| D796,421 S | 9/2017 | Huang |
| D802,404 S | 11/2017 | Turksu et al. |
| D804,487 S | 12/2017 | Theis |
| D807,339 S | 1/2018 | Lan |
| D826,225 S | 8/2018 | Chen |
| D832,248 S | 10/2018 | Sukphist et al. |
| D834,583 S | 11/2018 | Janzen et al. |
| D845,961 S | 4/2019 | Yao et al. |
| 10,259,400 B1* | 4/2019 | Song ............... B60R 11/0235 |
| D852,188 S | 6/2019 | He |
| D858,509 S | 9/2019 | Yao et al. |
| D859,286 S | 9/2019 | He |
| 10,598,199 B1* | 3/2020 | Fan ..................... B60R 11/02 |
| 2006/0221565 A1 | 10/2006 | Doherty et al. |
| 2008/0157716 A1 | 7/2008 | Jo |
| 2009/0160399 A1 | 6/2009 | Woud |
| 2009/0160400 A1 | 6/2009 | Woud |
| 2010/0062615 A1 | 3/2010 | Prest |
| 2010/0078343 A1 | 4/2010 | Hoellwarth et al. |
| 2011/0069445 A1 | 3/2011 | Haren et al. |
| 2012/0194132 A1 | 8/2012 | Ikegame |
| 2013/0050933 A1 | 2/2013 | Prest |
| 2013/0058036 A1 | 3/2013 | Holzer et al. |
| 2013/0217448 A1 | 8/2013 | Kim et al. |
| 2013/0241470 A1 | 9/2013 | Kim |
| 2014/0138419 A1* | 5/2014 | Minn ..................... F16B 2/065 |
| | | 224/567 |
| 2015/0098184 A1 | 4/2015 | Tsai et al. |
| 2016/0318455 A1 | 11/2016 | Zhang et al. |
| 2017/0035172 A1 | 2/2017 | Kim |
| 2017/0080877 A1* | 3/2017 | Boas ............... B60R 11/0241 |
| 2018/0345875 A1* | 12/2018 | Buchhalter .......... F16M 11/041 |
| 2019/0126843 A1* | 5/2019 | Bouchard ............ B60R 16/03 |

FOREIGN PATENT DOCUMENTS

| | | |
|---|---|---|
| KR | 30-0629517 | 1/2012 |
| TW | D132908 | 1/2010 |
| WO | WO DM061043 | 8/2002 |
| WO | WO 2011/139051 | 11/2011 |
| WO | WO 2015/054242 | 4/2015 |

OTHER PUBLICATIONS

Mophi Wireless Charging Vent Mount, accessed Sep. 9, 2019 (no post date), Apple Inc., URL: https://www.apple.com/shop/product/HMBB2ZM/A/mophie-wireless-charging-vent-mount.
U.S. Appl. No. 29/438,896, filed Dec. 4, 2012, Denny Tsai.
U.S. Appl. No. 29/438,221, filed Nov. 27, 2012, Denny Tsai.
U.S. Appl. No. 29/632,207, filed Jan. 5, 2018, Dang et al.
U.S. Appl. No. 29/654,350, filed Jun. 22, 2018, Dang et al.
U.S. Appl. No. 29/654,363, filed Jun. 22, 2018, Dang et al.
International Search Report and Written Opinion of the International Searching Authority for PCT/US2012/020370, dated May 29, 2012.

(56) References Cited

OTHER PUBLICATIONS

International Search Report and Written Opinion of the International Searching Authority for PCT/US2014/059483, dated Jan. 15, 2015.
International Preliminary Report on Patentability for PCT/US2014/059483, dated Apr. 12, 2016.
International Preliminary Report on Patentability for PCT/US2012/020370, dated Jul. 10, 2013.
Nick Guy, "RND Power Solutions Sync & Charge Dock with Lightning Connector", dated Nov. 18, 2013, http://www.ilounge.com/index.php/reviews/entry/tylt-energi-sl.
Nick Guy, "RND Power Solutions Sync & Charge Dock with Lightning Connector", dated Nov. 25, 2013, http://www.ilounge.com/index.php/reviews/entry/rnd-power-solutions-sync-charge-dock-with-lightning-connector/.
Nick Guy, "The Best Wireless Car Phone Charger Mounts", The Wirecutter, updated Jan. 22, 2019, https://thewirecutter.com/reviews/best-qi-wireless-car-phone-charger-mounts/.
Julie Strietelmeier, "Seidio INNODock Desktop Cradle for Treo 650," dated Jul. 28, 2005, http://the-gadgeteer.com/2005/07/28/seidio_innodock_desktop_cradle_for_treo_650/.
Altec Lansing Octiv Stage MP450 Review, dated Dec. 8, 2010, http://www.cnet.com/products/altec-lansing-octiv-stage-mp450/.
Mophie Unveils All-Aluminum PowerStand for iPad, dated Jan. 4, 2011, http://www.intomobile.com/2011/01/04/mophie-powerstand-swivels-charges-ipad/.
Mophie PowerStand for iPad (Video), dated Jan. 4, 2011, http://www.gottabemobile.com/2011/01/04/mophie-powerstand-for-ipad-video/.

* cited by examiner

MOUNT FOR HOLDING A MOBILE ELECTRONIC DEVICE

BACKGROUND

Field of the Disclosure

Some embodiments disclosed herein relate to mount, such as mounts for holding mobile electronic devices.

Description of the Related Art

Although some types of mounts are available for holding a mobile electronic device, there remains a need for improved device mounts.

SUMMARY OF CERTAIN EMBODIMENTS

Certain example embodiments are summarized below for illustrative purposes. The embodiments are not limited to the specific implementations recited herein. Embodiments may include several novel features, no single one of which is solely responsible for its desirable attributes or which is essential to the embodiments.

Various embodiments disclosed herein can relate to a mount for holding a mobile electronic device. The mount can include a main body, a vent mount configured to attach the main body to a vent of an automobile, a wireless charging antenna inside the main body, a right movable arm on a right side of the main body, and a left movable arm on a left side of the main body. The right and left movable arms can be movable between an inward configuration and an outward configuration. The right movable arm and the left movable arm can be closer to each other in the inward configuration than in the outward configuration. The left and right movable arms can be configured to hold a mobile electronic device, and in some cases can position the mobile electronic device relative to the wireless charging antenna so that the wireless charging antenna is operable to wireless charge the mobile electronic device. The mount can have a biasing mechanism for biasing the right and left movable arms towards the inward configuration. The mount can have a right stationary arm extending from the right side of the main body to a position to the right of the right movable arm and a left stationary arm extending from the left side of the main body to a position to the left of the left movable arm. When transitioning from the inward configuration to the outward configuration, the right movable arm can move towards the right stationary arm and the left movable arm can move towards the left stationary arm.

The mount can have a pinion gear with teeth. A right rack can be coupled to the right movable arm. The right rack can have teeth configured to engage the teeth of the pinion gear. A left rack can be coupled to the left movable arm. The left rack can have teeth configured to engage the teeth of the pinion gear. Movement of the right movable arm or the left movable arm can cause the pinion gear to rotate to thereby cause the other of the left movable arm or the right movable arm to also move (e.g., in an opposite direction).

The right and left stationary arms can be replaceably detachable from the main body. The vent mount can be replaceably detachable from the main body. The vent mount can have four blades. A first slot can be configured to orient the mount in a first orientation, and a second slot can be configured to orient the mount in a second configuration. The second orientation can be offset from the first orientation by about 80 degrees to about 100 degrees. The mount can include one or more air vents for cooling an interior of the main body.

A linear line can extend through the right stationary arm, the right movable arm, the left movable arm, and the left stationary arm (e.g., when the right and left movable arms are in the inward configuration and/or when the right and left arms are in the outward configuration). The right and left movable arms can move in a direction that is substantially parallel to the direction that the right and left stationary arms extend away from the main body.

Various embodiments disclosed herein can relate to a mount for holding a mobile electronic device. The mount can include a main body, at least one stationary arm, and at least one movable arm. The movable arm can be biased towards a direction away from the stationary arm.

The mount can include a vent mount configured to couple the main body to a vent blade. The mount can include a wireless charging antenna inside the main body.

The at least one movable arm can include a pair of movable arms. The at least one stationary arm can include a pair of stationary arms. The pair of movable arms can be positioned between the pair of stationary arms. A linear line can extend through the pair of movable arms and/or through the pair of stationary arms. The mount can include a rack and pinion coupling mechanism that couples the pair of movable arms so that the they move concurrently but in opposite directions. The pair of stationary arms can extend outward from the main body along corresponding first and second directions. The pair of movable arms can move in corresponding third and fourth directions. The first, second, third, and fourth directions can be substantially parallel.

Various embodiments disclosed herein can relate to a method of using a mount with a mobile electronic device. The method can include accessing a mobile electronic device and accessing a mount configured to hold the mobile electronic device. The mount can include a pair of movable arms that are movable between an inward position and an outward position. The pair of movable arms can be biased towards the inward position. The mount can include a pair of stationary arms, which can be positioned outward of the movable arms. The method can include pinching one of the pair of movable arms and one of the stationary arms towards each other to move the pair of movable arms towards the outward position. The method can include inserting a mobile electronic device between the pair of movable arms or removing a mobile electronic device from between the pair of movable arms. The method can include releasing the forces on the one of the pair of movable arms and the one of the stationary arms so that the pair of movable arms move towards the inward position.

Movement of the one of the pair of movable arms can cause the other of the pair of movable arms to move away from the one of the stationary arms. The mount can be coupled to a vent blade of an automobile. Pinching the one of the pair of movable arms and the one of the stationary arms towards each other can include abutting the mobile electronic device against the one of the movable arms, pressing on the mobile electronic device with a finger or thumb of a hand to drive the one of the movable arms towards the stationary arm, and pressing on the stationary arm with a finger or thumb of the same hand to stabilize the mount. In some embodiments, a straight line extends through the pair of movable arms and through the pair of stationary arms.

BRIEF DESCRIPTION OF THE DRAWINGS

Certain embodiments will be discussed in detail with reference to the following figures, wherein like reference

DETAILED DESCRIPTION OF CERTAIN EMBODIMENTS

A mount for holding a mobile electronic device (e.g., a mobile phone, cellphone, smartphone, tablet, PDA, etc.) can have at least one movable arm and at least one stationary arm. The stationary arm can provide a stable base to push against to move the movable arm while inserting the mobile electronic device into the mount or removing the mobile electronic device from the mount. This can reduce the forces applied to the mounting mechanism and/or the underlying structure that the mount is mounted to during insertion or removal of the mobile electronic device from the mount. This can also enable the use of more powerful springs or other biasing mechanisms for holding the mobile electronic device in the mount, which can reduce unintended movement of the mobile electronic device relative to the mount or accidental dislodging of the mobile electric device from the mount. The mount can enable reliable one-handed insertion of the mobile electronic device into the mount and/or reliable one-handed removal of the mobile electronic device from the mount. The mount can be configured to wirelessly charge the mobile electronic device.

Figure 1:
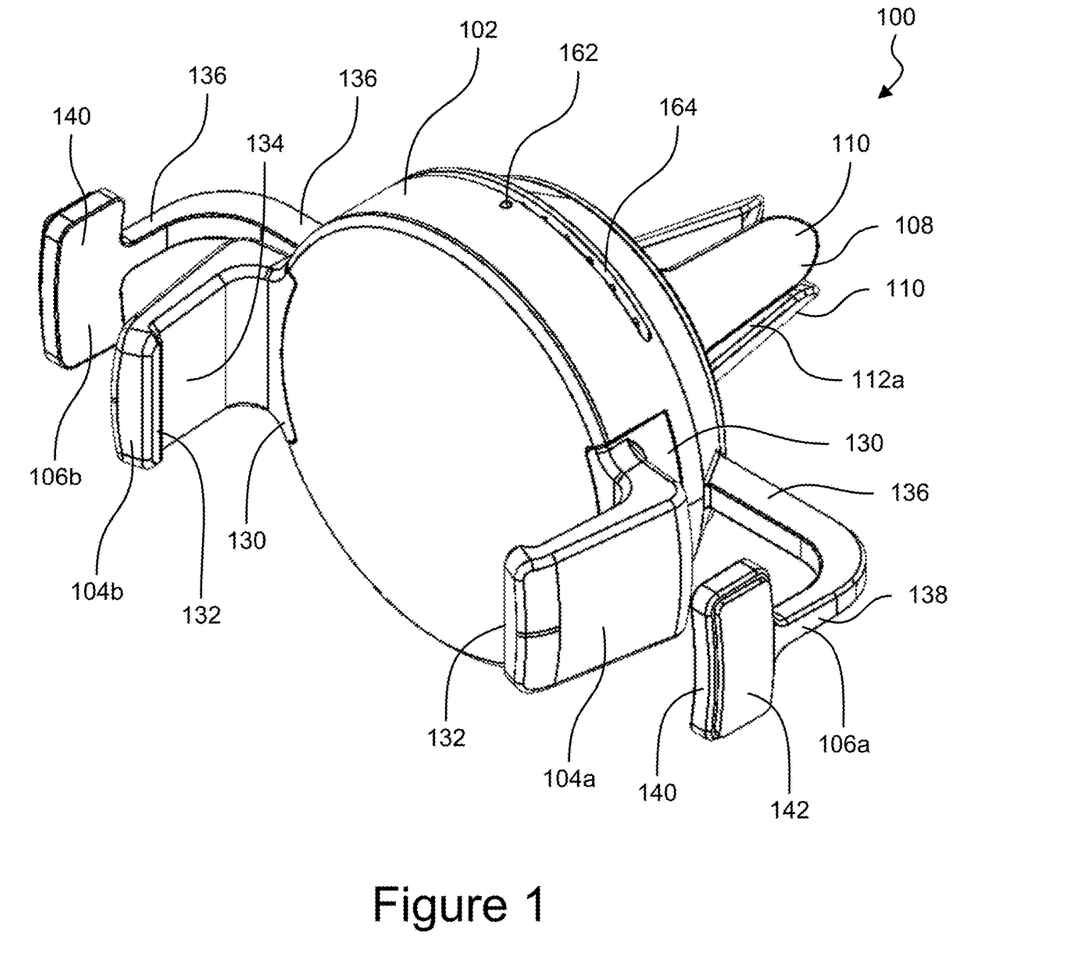
FIG. 1 is a top and front perspective view of an example embodiment of a mount for holding a mobile electronic device.
Figure 2:
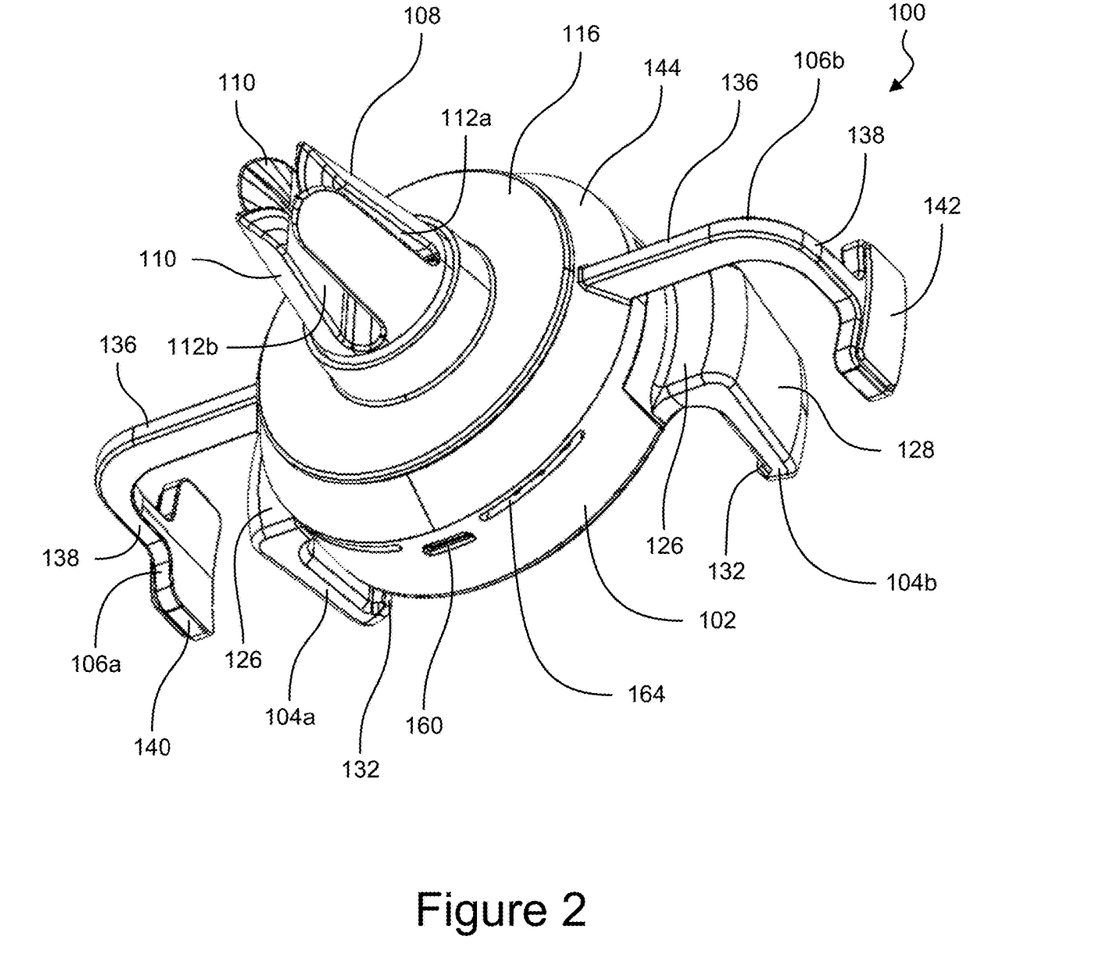
FIG. 2 is a bottom and rear perspective view of the mount.
Figure 11:
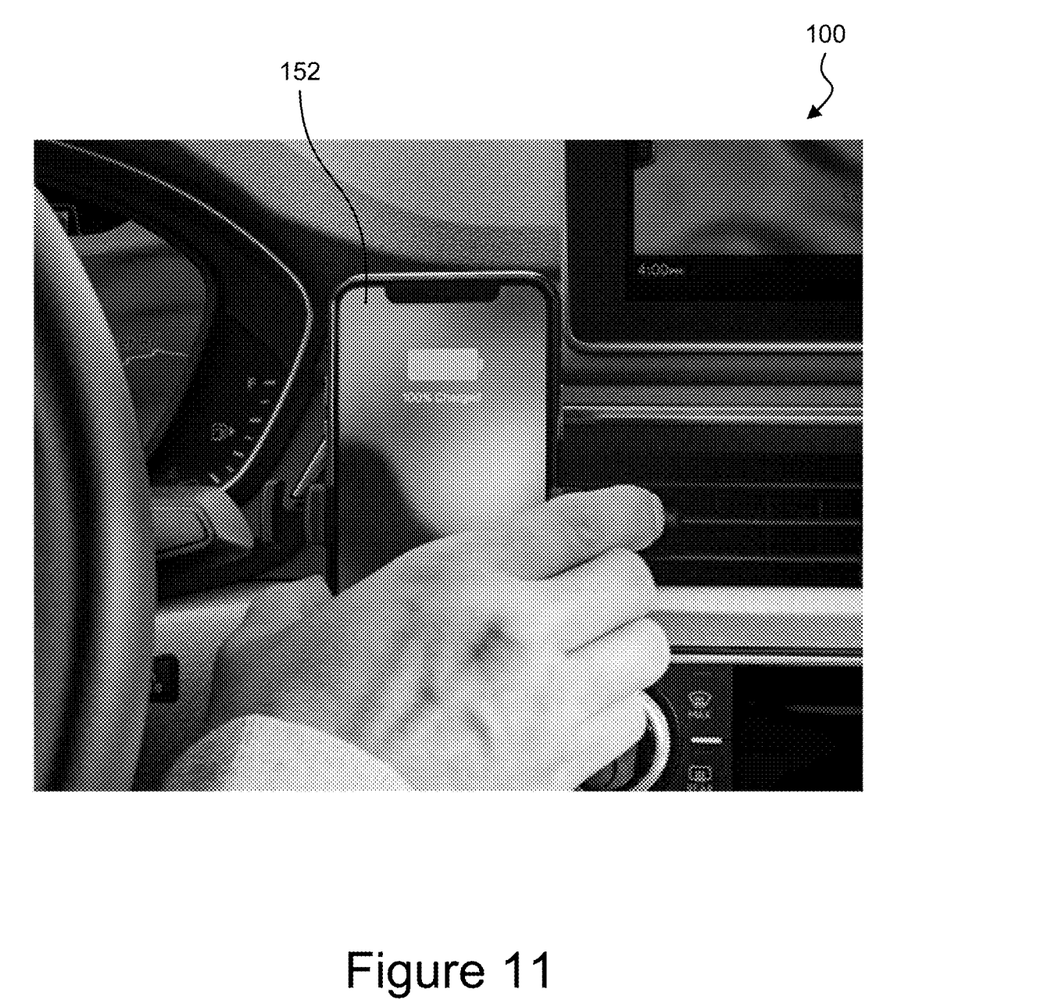
FIG. 11 shows a user operating the mount to insert or remove a mobile electronic device.

FIG. 1 is a top and front perspective view of an example embodiment of a mount 100 for holding a mobile electronic device. FIG. 2 is a bottom and rear perspective view of the mount 100. The mount 100 can have a main body 102, a pair of movable arms 104a-b, and a pair of stationary arms 106a-b. The mount 100 can have a mounting mechanism 108 for attaching the mount 100 to an underlying structure. Various types of mounting mechanisms 108 can be used. In FIGS. 1 and 2, a vent mount 108 is shown. The vent mount 108 can have multiple blades 110 that are separated by one or more gaps 112 that are configured to receive a blade of a vent, such as on a heating and/or cooling system in an automobile. The vent mount 108 can have four blades 100 that are spaced apart to provide two slots 112a-b for receiving a vent blade or other underlying mounting structure. A first (e.g., generally horizontal) slot 112a can separate the two upper blades from the two lower blades so that the vent blade can be received into the slot 112a, which can orient the mobile electronic device in a first (e.g., portrait) orientation. FIG. 11, for example, shows the mount 100 attached to a vent of an automobile while holding a mobile electronic device in a portrait orientation. A second (e.g., generally vertical) slot 112b can separate the right blades from the left blades so that the vent blade can be received into the slot 112b, which can orient the mobile electronic device in a second (e.g., landscape) orientation. The mounting mechanism 108 can enable the mount 100 to be attached to the underlying structure at two orientations that can be offset from each other by about 90 degrees (e.g., between about 80 degrees and about 100 degrees, or between about 85 degrees and about 95 degrees).

Various other mounting mechanisms can be used. For example, the vent mount 108 can have only two blades 110 with a slot 112 therebetween so that the mount 100 has a single attachment orientation. In some embodiments, the blades 110 can be movable, such as to clamp down on the vent blade, or other underlying structure, when in a closed position, and to release from the vent blade when in an open position. The mounting mechanism 108 can include a suction cup, micro-suction tape, an adhesive, a clamp, a friction fit mechanism, a magnetic element, a screw or threaded receiver, a snap, a base or stand, or any other suitable structure for coupling the mount 100 to an underlying structure. Various embodiments herein are discussed in connection with mounting to a vent in an automobile, but the mount 100 can be mounted to a dashboard, windshield, cup-holder, handlebar, desk, wall, pole, post, or any other suitable structure. In some cases, the mounting structure 108 can have a ball joint, a pivot or hinge joint, a swivel, or other type of joint for changing the orientation of the mount relative to the underlying mounting structure.

Figure 3:
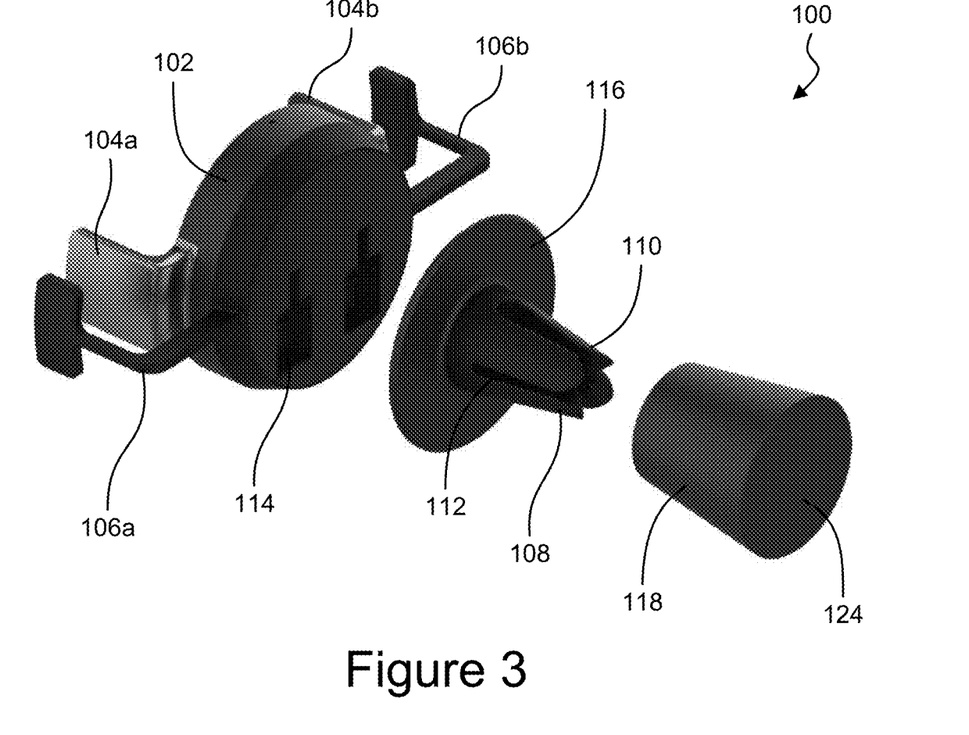
FIG. 3 is a rear and top perspective view of an example embodiment of a mount having a removable mounting mechanism.

In some embodiments, the mounting mechanism 108 can be replaceably detachable from the main body 102. FIG. 3 is a rear and top perspective view of an example embodiment of a mount 100 having a removable mounting mechanism 108. The main body 102 can have one or more engagement features 114 that are configured to releasably engage with one or more engagement features on the mounting mechanism 108. By way of example, the main body 102 can have one or more recesses 114 (e.g., two recesses in FIG. 3) that are configured to receive corresponding protrusions 115, which are hidden from view in FIG. 3 but can be seen in the cross-sectional view of FIG. 7. The one or more recesses 114 can have a wide portion and a narrow portion. The protrusion 115 can be inserted into the wide portion of the recess 114 and can then be slid or otherwise moved into the narrow portion of the recess 114 to maintain the protrusion 115 in engagement with the recess 114, and/or to impede the protrusion 115 from pulling out of the recess 114. The protrusion 115 can have a T-shape, so that it can fit into the wide portion of the recess 114 and slide into engagement with the narrow portion of the recess 114. The mounting mechanism 108 can have a mounting plate 116. The one or more protrusions 115 can extend from a first (e.g., front) side of the mounting plate 116, and the blades 110 can extend from a second (e.g., back) side of the mounting plate 116. Various other types of engagement mechanisms can be used, such as snaps, clamps, friction fit elements, screws and threaded receivers, etc., for coupling the mounting mechanism 108 to the main body 102. In some embodiments, the mounting mechanism 108 can be permanently attached to the main body 102.

Figure 4:
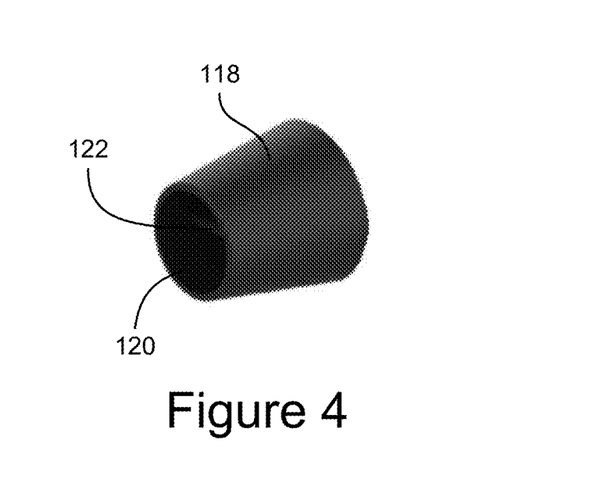
FIG. 4 shows a top and front perspective view of an example embodiment of a mounting cup.

With continued reference to FIG. 3, in some embodiments, the mount 100 can include a mounting cup 118. FIG. 4 shows a top and front perspective view of an example embodiment of a mounting cup 118. The mounting cup 118 can have a generally cylindrical or generally frustoconical shape, although other shapes could also be used. A first (e.g., front) side of the mounting cup 118 can have a recess 120 for receiving the blades 110 of the mounting mechanism 108. A blade 122 can be positioned in the recess 120 for engaging a slot 112 between the blades 110, to couple the engagement mechanism 108 to the mounting cup 118 (e.g., similar to the coupling to the vent blade, as discussed herein). The mounting cup 118 can be used for mounting to an underlying mounting structure, such as be using a different type of mounting mechanism than the blades 110. For example, the mounting cup 118 can have a second (e.g., back) side that has an adhesive (e.g., adhesive tape) or suction cup or other type of mounting mechanism.

Figure 5:
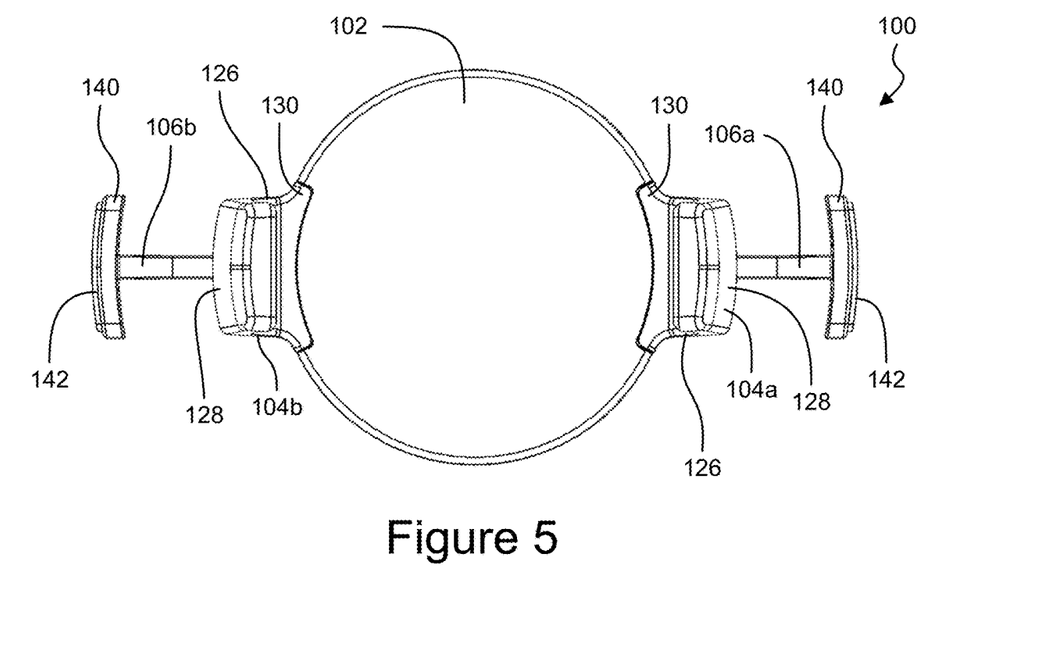
FIG. 5 shows an example embodiment of a mount with movable arms in an inward position.
Figure 6:
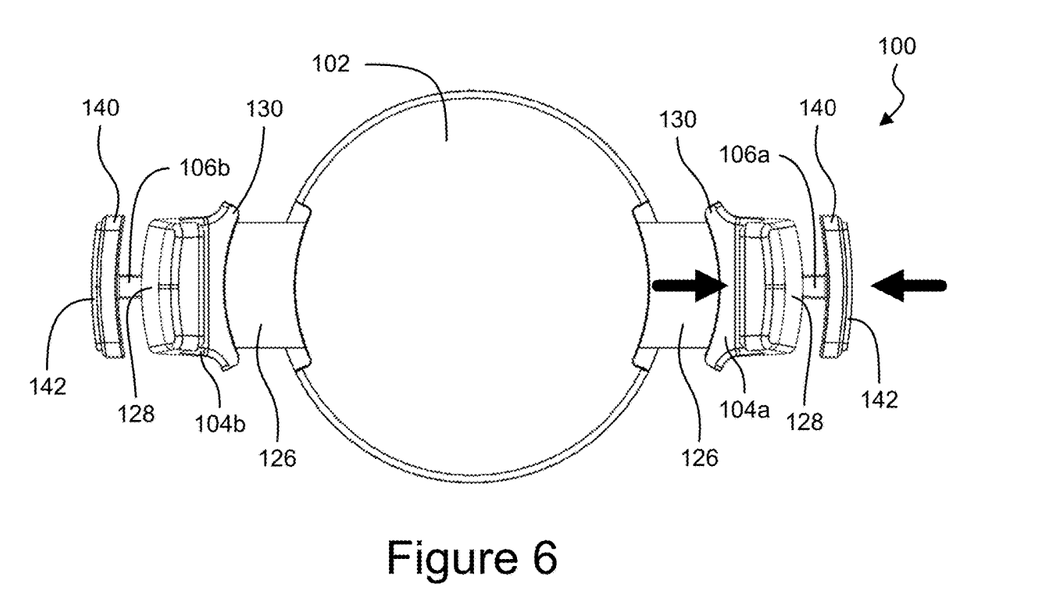
FIG. 6 shows the mount with the movable arms in an outward position.

FIG. 5 shows the movable arms 104a-b in a first (e.g., inward) position or configuration. FIG. 6 shows the movable arms 104a-b in a second (e.g., outward) position or configuration. The inner arms 104a-b can be L-shaped. The arms 104a-b can have a first portion 126 that extends outwardly or laterally away from the main body 102, and a second portion 128 that extends forward, or axially, or generally orthogonal to the first portion 126. The second portion 128 can extend in a direction that is angled relative to the direction of the first portion 126 by about 70 degrees, about 80 degrees, about 85 degrees, about 90 degrees, about 95 degrees, about 100 degrees, about 120 degrees, or any values therebetween, or any ranges bounded therein, although other configurations are possible. At least a portion of the arms 104a-b (e.g., at least a portion of the first portions 126 thereof) can be recessed inside the main body 102 when the arms 104a-b are in the inward position and can be disposed outside the main body 102 when the arms 104a-b are in the outward position, as shown for example in FIG. 6. The arms 104a-b can have a flange 130 that fits into a cutout in the main body 102 when the arms 104a-b are in the inward position. The arms 104a-b can have a lip 132 at the end, which can impede the mobile electronic device from moving forward to slip out of the arms 104a-b. Pads 134 can be disposed on the inwardly facing sides of the arms 104a-b, such as on the sides of the second portions 128 that face towards the main body 102. The pads 134 can be made of a material that is configured to facilitate holding the mobile electronic device, such as a compressible material, a soft material, a rubberized material, a grip material, etc. In some embodiments, the pads 134 can be omitted. In some cases, the inwardly facing surface can be textured.

The outer arms 106a-b can be L-shaped. The arms 106a-b can have a first portion 136 that extends outwardly or laterally away from the main body 102, and a second portion 138 that extends forward, or axially, or generally orthogonal to the first portion 136. The second portion 138 can extend in a direction that is angled relative to the direction of the first portion 136 by about 70 degrees, about 80 degrees, about 85 degrees, about 90 degrees, about 95 degrees, about 100 degrees, about 120 degrees, or any values therebetween, or any ranges bounded therein, although other configurations are possible. The arms 106a-b can have an end portion 140 that can be wider than the first portion 136 and/or second portion 138 of the arms 106a-b. The end portion 140 can provide a stable base for the user to press against to move the movable arms 104a-b. The end portion 140 can be generally rectangular in shape (e.g., having rounded corners), although various other shapes could be used. Pads 142 can be disposed on the outwardly facing sides of the arms 106a-b, such as on the sides of the end portions 140 that face away from the main body 102. The pads 142 can be made of a material that is configured to facilitate grip and or comfort as a user presses on the arms 106a-b, such as a compressible material, a soft material, a rubberized material, a grip material, etc. In some embodiments, the pads 142 can be omitted. In some cases, the outwardly facing surface can be textured (e.g., to improve grip).

In some embodiments, the outer arms 106a-b can be replaceably detachable from the main body 102. The arms 106a-b can be coupled to an engagement mechanism 116 that is configured to engage a corresponding engagement mechanism on the main body 102. For example, a coupler 144 can have the arms 106a-b attached thereto (e.g., integrally formed), and the coupler 144 can have engagement features, such as protrusions, that engage with corresponding engagement features, such as recesses or slots, on the main body 102 to attach the coupler 144, and the arms 106a-b, to the main body 102. To detach the arms 106a-b, the coupler 144 and arms 106a-b can be rotated to disengage the protrusions from the recesses, and the coupler 144 and arms 106a-b can pulled away from the main body 102 (e.g., in a rearward direction). To attach the arms 106a-b, the coupler 144 and arms 106a-b can be placed onto the main body 102 at a position offset from the illustrated configurations, and the coupler 144 and arms 106a-b can be rotated to engage the protrusions with the corresponding recesses, to secure the arms 106a-b to the main body 102. A stopper can impede the arms 106a-b and/or coupler 144 from being over-rotated. For example, a structure on the coupler 144 can abut against a corresponding structure on the main body 102 when the arms 106a-b are positioned at the orientation shown. Various other types of engagement features can be used, such as clamps, snaps, friction fit features, screws and threated receivers, etc. In some embodiments, the coupler 144 can be ring or a partial arcuate shape, as shown in FIG. 2 for example, but other shapes can be used. In some cases the coupler 144 can have an opening in the middle for receiving a portion of the main body 102 and/or the mounting mechanism 108 therein when being attached. In some cases, the mounting mechanism 108 can impede removal of the arms 106a-b unless the mounting mechanism 108 (e.g., the mounting plate 116) is first removed from the main body 102. The coupler 144 can extend around a periphery or perimeter of the main body 102, such as extending a full 360 degrees, or only a portion thereof, around the main body 102. The coupler 144 can have a generally circular shape, or a generally rectangular shape (e.g., having rounded corners), a closed shape, or an open shape, or any other suitable shape. In some embodiments, the arms 106a-b can be individually removable. For example, each of the arms 106a-b can have independent engagement features that are configured to engage corresponding engagement features on the main body 102 to removably couple the arms 106a-b to the main body 102.

Figure 7:
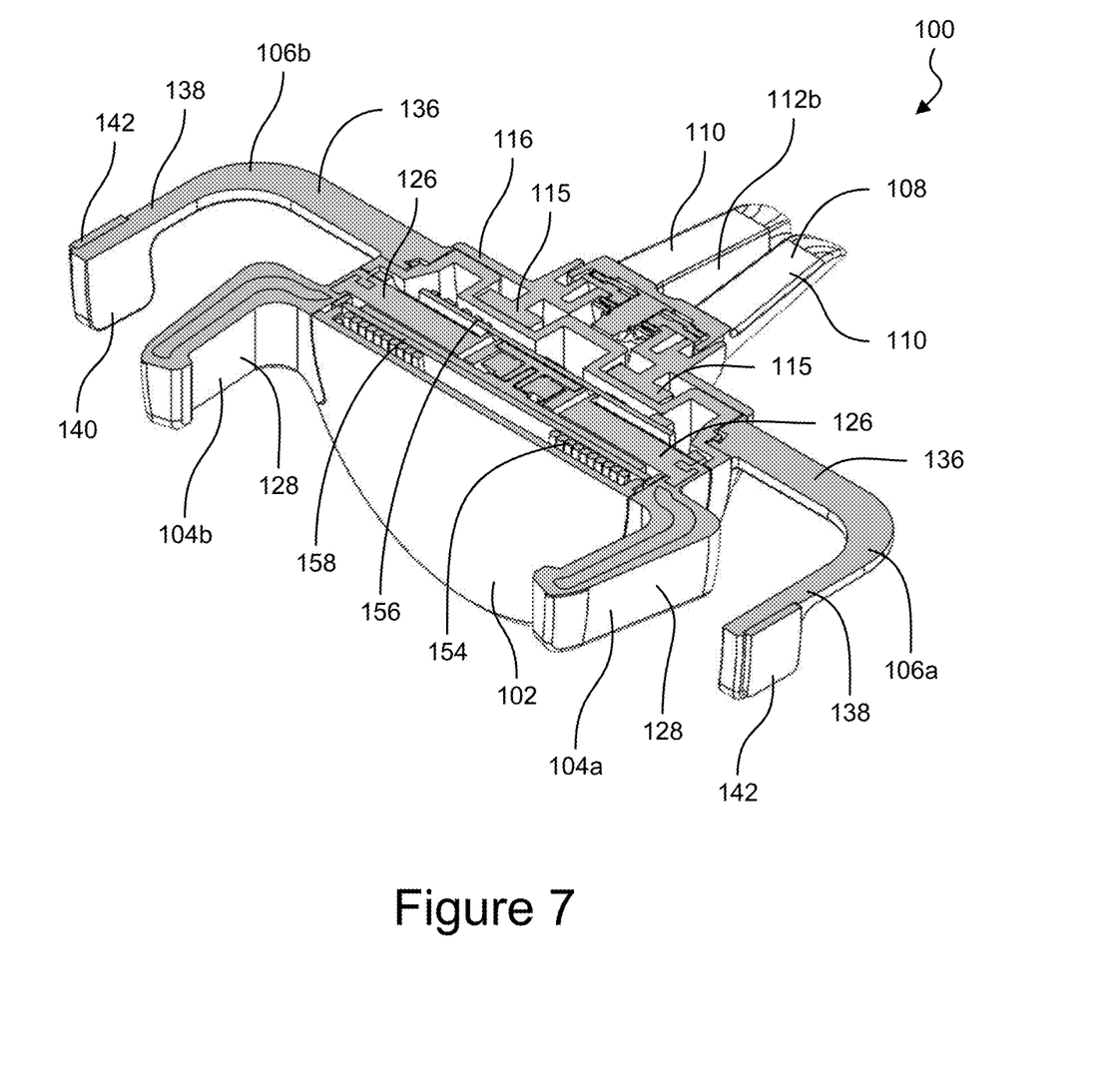
FIG. 7 is a cross-sectional perspective view of the example embodiment of a mount for holding a mobile electronic device, taken through a horizontal plane.
Figure 8:
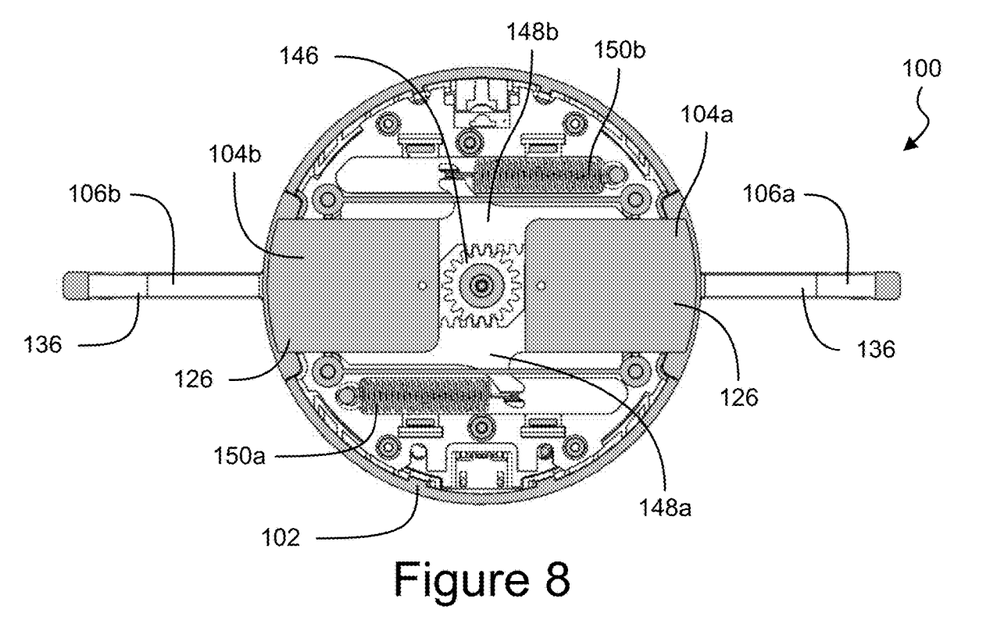
FIG. 8 is a cross-sectional view of the mount taken through a first vertical plane.
Figure 9:
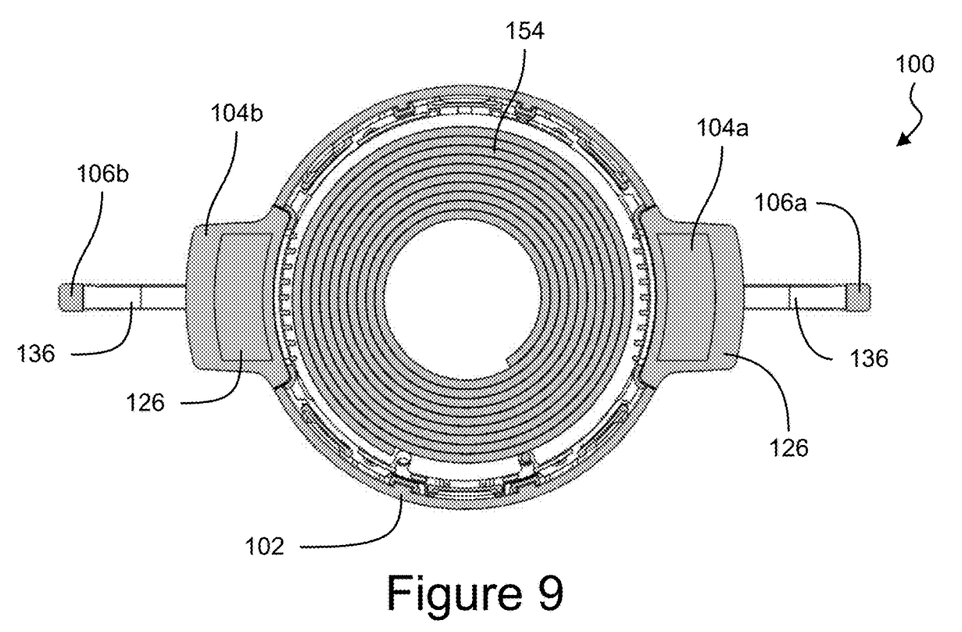
FIG. 9 is a cross-sectional view of the mount taken through a second vertical plane.

FIG. 7 is a cross-sectional perspective view of the example embodiment of a mount 100 for holding a mobile electronic device, taken through a horizontal plane. FIG. 8 is a cross-sectional view of the mount 100 taken through a first vertical plane. FIG. 9 is a cross-sectional view of the mount 100 taken through second vertical plan that is forward of the first vertical plane. In some embodiments, movement of the right arm 104a can cause the left arm 104b to move in a corresponding manner, and movement of the left arm 104b can cause the right arm 104a to move in a corresponding manner. Accordingly, the pair of movable arms 104a-b can move together between the inward position and the outward position. The movable arms 104a-b can both move towards the main body 102 and/or away from the corresponding outer or stationary arms 106a-b when transitioning to the inward position. The movable arms 104a-b can both move towards the corresponding outer or stationary arms 106a-b and/or away from the main body 102 when transitioning to the outward position. The mount 100 can have a rack and pinion system configured to cause the arms 104a-b to move together (e.g., but in opposite directions). With reference to FIG. 8, a pinion gear 146 can engage a first rack 148a that is coupled to the first movable arm 104a and a second rack 148b that is coupled to the second movable arm 104b. The pinion gear 146 can have teeth that engage teeth on the first rack 148a and teeth on the second rack 148b. the pinion gear 146 can engage the first rack 148a and the second rack 148b on opposing sides, so that the first and second racks 148a-b move together, but in opposite directions. By way of example, when the right movable arm 104a moves to the right (e.g., when a user pinches the right movable arm 104a and the right stationary arm 106a together), the first rack 148a can cause the pinion gear 146 to rotate, and rotation of the pinion gear 146 can cause the second rack 148b to move to the left, which can push the left movable arm 104b to the left. Similarly, when the left movable arm 104b is moved to the left (e.g., when a user pinches the left movable arm 104b and the left stationary arm 106b together), the rack and pinion system can cause the right movable arm 104a to move to the right (e.g., even without the user applying any force directly to the right movable arm 104a). Also, when one of the right and left movable arms 104a-b moves towards the inward position, the rack and pinion system can cause the other of the right and left movable arms 104a-b to also move towards the inward position.

The movable arms 104a-b can be biased towards the inward position, such as by a spring or other biasing mechanism. With reference to FIG. 8, a first spring 150a can be coupled on one side to the first rack 148a or right movable arm 104a and coupled on the other side to the housing of the main body 102 (e.g., to a pin or post). When the right arm 104a and/or the first rack 148a move to the right, the spring 150a can stretch thereby applying a biasing force that pulls the right arm 104a and/or the first rack 148a inwardly (e.g., leftward). Similarly, a second spring 150b can be coupled on one side to the second rack 148b or left movable arm 104b and coupled on the other side to the housing of the main body 102 (e.g., to a pin or post). When the left arm 104b and/or the second rack 148b move to the left, the spring 150b can stretch thereby applying a biasing force that pulls the left arm 104b and/or the second rack 148b inwardly (e.g., rightward). Many variations are possible. In some embodiments, a single spring can be used to bias both of the movable arms 104a-b toward the inward position (e.g., due to the rack and pinion coupling between the movable arms 104a-b). Various types of springs can be used, such as a coil spring, a compression spring, and extension spring, a torsion spring, a leaf spring, a flat spring, a cantilever spring, or any other suitable type of biasing mechanism. The movable arms 104a-b that are biased inwardly or towards each other can hold the mobile electronic device 152, as shown for example in FIG. 10.

In some embodiments, the mount 100 can be configured to provide wireless charging to the mobile electronic device 152. The mount 100 can include a wireless charging antenna 154, which can be a coil antenna, although any suitable antenna configuration or type can be used. The antenna 154 can be seen, for example, in FIGS. 7 and 9. The wireless charging can be performed using inductive charging, although any form of wireless charging or power transfer can be used. The arms 104a-b can be configured to hold the mobile electronic device 152 so that the wireless charging antenna 154 aligns with a corresponding receiver antenna of the mobile electronic device 152. The main body 102 can have a front housing wall that can be configured to be positioned against or adjacent the back of the mobile electronic device. The antenna 154 can be disposed on the other side of the front housing wall of the main body 102 (e.g., opposite the mobile electronic device 152). In some cases, the only component between the antenna 154 and the mobile electronic device 152 is the front housing wall of the main body 102. The main body 102 can have a first (e.g., forward) chamber that houses the antenna 154. The main body 102 can have a second (e.g., rearward) chamber that houses circuitry 156 for operating the mount 100, as described herein. In some embodiments, the second chamber can receive portions of the arms 104a-b, can house the pinion gear 146, racks 148a-b, and/or springs 150a-b. In some embodiments, the circuitry 156 can be disposed rearward of the pinion gear 146, racks 148a-b, and/or springs 150a-b. The pinion gear 146, racks 148a-b, and/or springs 150a-b can be between the antenna 154 and the circuitry 156, and an electrical interconnection (e.g., wire or trace or the like) can relay electrical power, control signals, or other electrical signals between the circuitry 156 and the antenna 154. One or more walls can separate the first chamber from the second chamber, which can be completely isolated or only partially isolated (e.g., by a wall with gaps or holes that interconnect the first and second chambers. In some embodiments, a shielding material 158 (e.g., ferrite) can be disposed between the antenna 154 and the circuitry 156. The shielding material 158 can impede the wireless signals emitted by the antenna 154 (e.g., for charging the mobile electronic device 152) from affecting the circuitry 156, which could have adverse effects.

The mount 100 can have circuitry 156 (e.g., disposed inside the main body 102) for performing the wireless charging, and/or other functions described herein. The mount 100 can have an electrical interface or port 160, which can be on the main body 102, such as on the bottom thereof, as show for example in FIG. 2, although various other suitable positions can be used. The electrical interface 160 can be a USB port, a micro-USB port, a mini-USB port, a lightning port, a USB-C port, or any other type of suitable electrical connector or receiver, such as that can transmit or receive electrical power, control signals, or other electrical signals. The circuitry 156 can relay electrical power received through the electrical interface 160 to the antenna 154. The circuitry 156 can modify the electrical power or signals and can deliver the modified electrical power or signals to the antenna 154. The circuitry can include a power converter, a voltage modifier, a direct current to direct current (DC-DC) power converter, a direct current to alternating current (DC-AC) power converter (e.g., for providing AC to the antenna 154 for inductive wireless charging), an AC-DC power converter, a processor or other hardware controller, computer-readable memory, etc. The mount 100 can have a user output element 162 for outputting information to a user. For example, a light 162 (e.g., a light emitting diode (LED)) can be used to communicate information to the user. For example, the light 162 can turn on, turn off, flash, change color, etc. to indicate information about the mount, such as to indicate that the mount is wirelessly charging the mobile electronic device 152. The light 162 can be on the main body 102, such as on the top thereof, as shown in FIG. 1, although various other suitable positions can be used.

The mount 100 can have one or more vents 164, which can facilitate cooling of the interior of the mount 100. For example, the main body 102 can have one or more opening 164 on the periphery or outwardly facing sides. As shown in FIGS. 1 and 2, the main body can have a first vent 162 on the top of the main body, and second and third vents 162 on the bottom of the main body 102, such as on right and left sides of the electrical interface 160. Various other configurations are possible. For example, additional openings can be includes, or fewer openings can be used, and openings can be located at different positions than those shown in the illustrated embodiments. The one or more vents 162 can enable air exchange between the interior of the main body 102 and the ambient air outside the mount 100. The air inside the mount 100 can be heated, such as from the electrical power or other electrical passing through the circuitry 156 and/or the antenna 154. The heated air can exit the mount 100 through the one or more vents 164, and cooler air can enter the mount through the one or more vents 164. In some cases, the heated air can tend to rise, thereby exiting through the upper vent, which can draw cooler air into the mount 100 through the lower vent, which can result in a flow of air through the mount 100. In some embodiments, the mount 100 can use passive cooling or active cooling. A fan can be used to drive air in or out of the mount 100, such as through the one or more vents 164. In some cases, the mount 100 can have a temperature sensor, and the fan can be turned on and off based on the temperature measured by the temperature sensor. For example, the fan can turn on above a threshold temperature and can turn off below a temperature threshold.

Figure 10:
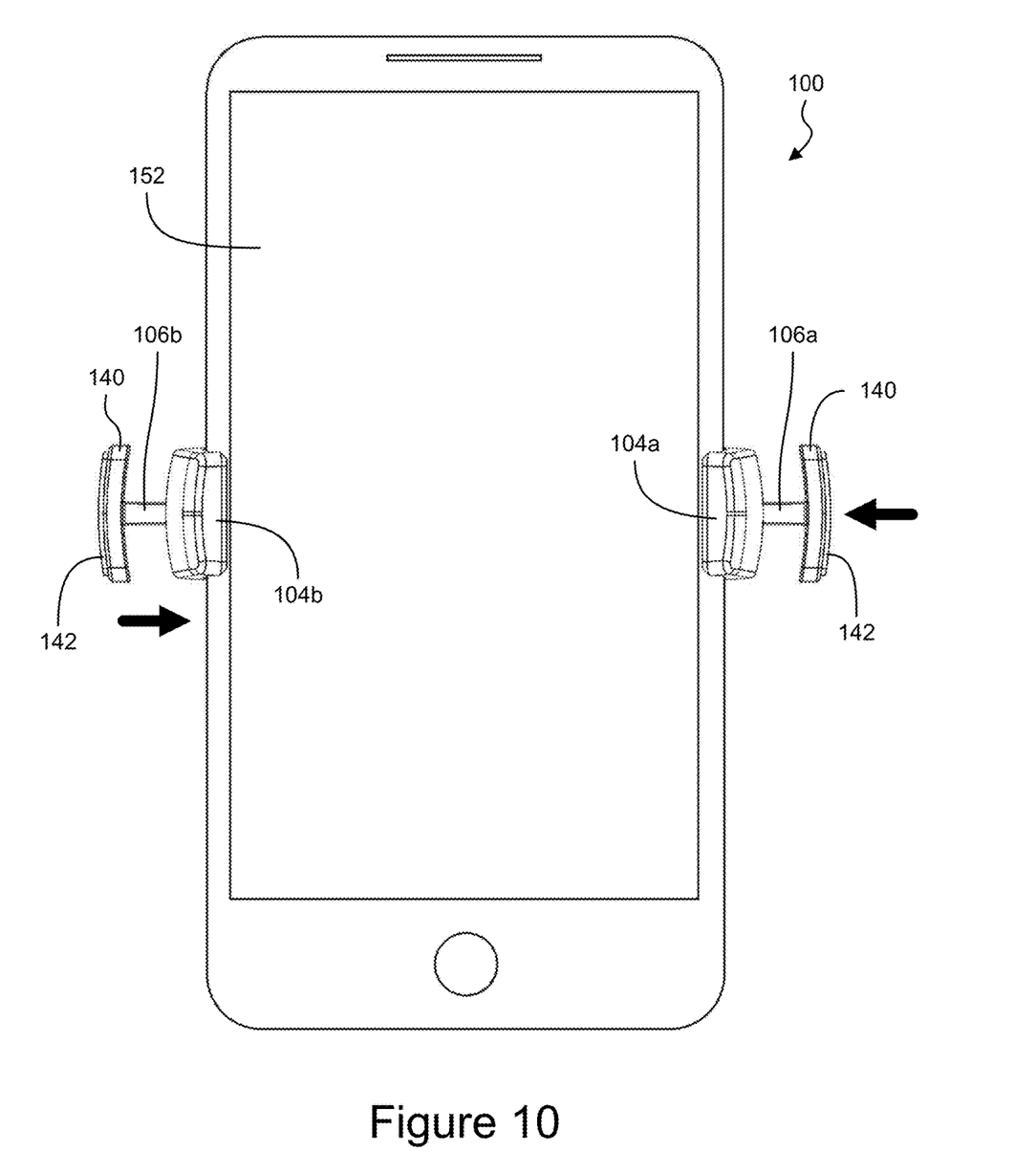
FIG. 10 shows an example embodiment of a mount holding a mobile electronic device.

The external or stationary arms 106a-b can provide a stable object to push against when moving the internal or movable arms 104a-b towards the outward or open position. The user can press the right stationary arm 106a inward while pressing the right movable arm 104a outward, which can cause the right movable arm 104a to move outwardly (e.g., and the left movable arm 104b as well via the rack and pinion coupling), as shown for example by the arrows in FIG. 6. The user can place a thumb or finger on the outwardly facing surface of the stationary arm 106a (e.g., on the pad 142 or end portion 140 of the stationary arm 106a), and the user can place another finger or thumb on the inwardly facing surface of the movable arm 104a (e.g., on the pad 134 or lip 134), and the user can pinch the arms 104a and 106a together. In some cases, the user can press one or both of the arms 104a and 106a indirectly, such as by pressing on the mobile electronic device 152, which can be abutted against the arm 104a, for example, as shown in FIGS. 10 and 11. Pressing against the stationary arm 106a can enable the user to move the movable arm 104a toward the open or outward position while reducing the amount of force delivered to the mounting mechanism 108 or underlying mounting structure. For example, for a mount attached to a vent blade that does not have any stationary arms 106a-b, the user can press the movable arm outward thereby applying force (e.g., torque) to the vent mount 108 and/or to the vent blade. That force can cause the mount to unintentionally become disconnected from the vent blade, can damage the vent blade or vent mount mechanism, and/or can cause the mount to move as force is applied, which can impede the ability of the user to insert or remove the mobile electronic device. The stationary arms 106a-b can enable the user to stabilize the mount 100 while applying force to move the movable arms 104a-b to the open or outward position (e.g., using only one hand). This can facilitate keeping the mount relatively still and stable during insertion or removal of the mobile electronic device, and can prevent damage to the mount or underlying structure (e.g., the automobile vent blade).

For some mounts without stationary arms 106a-b, a relatively weak spring can be used so that the movable arms can be moved to the open or outward position with relatively little force thereby causing only a relatively small amount of force (e.g., torque) to be applied to the mounting mechanism 108 and/or underlying structure (e.g., the vent blade). While this approach can reduce the likelihood of damaging the underlying vent blade, the relatively weak spring can cause the mobile electronic device to more easily become unintentionally dislodged from the mount itself. The mount 100 with one or more stationary arms 106a-b can enable the use of more powerful springs or other types of biasing mechanisms, which can more securely hold the mobile electronic device 152 in the mount, such as while also provide reliable and easy one-handed operation, as described herein. In some cases, a user can hold a mount without one or more stationary arms 106a-b with one hand while using the other hand to move the one or more movable arms towards the open or outward position, such as for insertion or removal of a mobile electronic device. While this two-handed operation can enable the user to reduce forces (e.g., torque) from being transferred to the mounting mechanism 108 or underlying mounting structure (e.g., the vent blade), two-handed operation can be undesirable or unsafe, such as while operating an automobile. Various of the mount 100 embodiments disclosed herein can enable a user to insert or remove the mobile electronic device 152 with one-handed operation, such as by pinching one of the movable arms 104a-b and one of the stationary arms 106a-b together.

By way of example, to insert the mobile electronic device 152 into the mount 100, the mount 100 can start with the one or more movable arms 104a-b in the closed or inward position. The user can angle the mobile electronic device so that one side (e.g., the right side) of the mobile electronic device 152 abuts against an inwardly facing surface of one of the movable arms 104a-b (e.g., the inside of the right movable arm 104a). The user can place a finger or thumb on the outwardly facing surface of one of the stationary arms 106a-b (e.g., the outside of the right stationary arm 106a). The user can press the mobile electronic device 152 against the one of the movable arms 104a-b (e.g., by pressing on the left side of the mobile electronic device 152), while pressing on the one of the stationary arms 106a-b (e.g., in the direction of the mobile electronic device 152 or towards the one of the movable arms 104a-b), as shown for example by the arrows in FIG. 10. The user can push the mobile electronic device 152 and the one of the movable arms 104a-b until the distance between the movable arms 104a-b is large enough (e.g., larger than the width of the mobile electronic device) to permit the mobile electronic device 152 to move into the space between the movable arms 104a-b. Then the user can release the forces on the mobile electronic device 152 and/or the one of the movable arms 104a-b and the one of the stationary arms 106a-b, which can cause the movable arms 104a-b to grip the mobile electronic device 152, such as by moving towards the closed or inward position (e.g., due to the springs 150a-b). The presence of the mobile electronic device 152 between the movable arms 104a-b can impede the movable arms from transitioning back to the inward or closed positions, and the biased arms 104a-b can hold the mobile electronic device 152 in the mount 100. FIG. 11 shows an example of a user holding the mobile electronic device 152 between the thumb and one or more fingers, while one or more other fingers (e.g., an index finger) presses on the stationary arm 106a, such as for insertion or removal of the mobile electronic device, as discussed herein.

By way of example, to remove the mobile electronic device 152 from the mount 100, the mount 100 can start with the one or more movable arms 104a-b between the closed or inward position and the open or outward position, with the mobile electronic device 152 between the arms 104a-b and being held in the mount by the arms 104a-b. The user can place a finger or thumb on the outwardly facing surface of one of the stationary arms 106a-b (e.g., the outside of the right stationary arm 106a). The user can press the mobile electronic device 152 against the one of the movable arms 104a-b (e.g., by pressing on the left side of the mobile electronic device 152), while pressing on the one of the stationary arms 106a-b (e.g., in the direction of the mobile electronic device 152 or towards the one of the movable arms 104a-b), as shown for example by the arrows in FIG. 10. The user can push the mobile electronic device 152 and the one of the movable arms 104a-b until the distance between the movable arms 104a-b is large enough (e.g., larger than the width of the mobile electronic device) to permit the mobile electronic device 152 to move out of the space between the movable arms 104a-b. The user can angle the mobile electronic device so that one side (e.g., the right side) of the mobile electronic device 152 remains abutted against the inwardly facing surface of the one of the movable arms 104a-b (e.g., the inside of the right movable arm 104a), while the other side (e.g., the left side) of the mobile electronic device 152 is moved (e.g., forward) out from the space between the movable arms 104a-b. Then the user can release the forces on the mobile electronic device 152 and/or the one of the movable arms 104a-b and the one of the stationary arms 106a-b, which can cause the movable arms 104a-b to move to the closed or inward position (e.g., due to the springs 150a-b). The mobile electronic device 152 can be disengaged from the one of the movable arms 104a-b and full removed from the mount. FIG. 11 shows an example of a user holding the mobile electronic device 152 between the thumb and one or more fingers, while one or more other fingers (e.g., an index finger) presses on the stationary arm 106a, such as for insertion or removal of the mobile electronic device, as discussed herein.

A linear line can extend through both the movable arms 104a-b and the stationary arms 106a-b (e.g., when the movable arms 104a-b are in the closed or inward position as well as when the movable arms 104a-b are in the open or outward position). The linear line can intersect the right stationary arm 106a, then the right movable arm 104a, then the left movable arm 104b, and then the left stationary arm 106b. The linear line can intersect the mobile electronic device 152 as well, when it is in the mount 100. The linear line can intersect the portions of the movable arms 104a-b that are configured to abut against the mobile electronic device 152 and can also intersect the portions of the stationary arms 106a-b that are configured to be pressed on by the user during insertion or removal of the mobile electronic device 152. In some embodiments, the movable or interior arms 104a-b can extend further forward than the stationary or exterior arms 106a-b, although the inverse configuration could also be used. In some embodiments, the movable arms 104a-b can have a range of motion that enables the movable arms to contact the corresponding stationary arms 106a-b. In some implementations, the mount 100 can have one or more stoppers configured to stop the movable arms 104a-b before they contact the corresponding stationary arms 106a-b. The stationary arms 106a-b can couple to the main body 102 at locations that are rearward (e.g., further away from the mobile electronic device 152) of the locations where the movable arms 104a-b couple to the main body 102. The two movable arms 104a-b can be symmetrical (e.g., mirror images of each other). Each of the movable arms 104a-b can be symmetrical (e.g., about a horizontal place, such as the intersection plane of FIG. 7). The two stationary arms 106a-b can be symmetrical (e.g., mirror images of each other). Each of the stationary arms 106a-b can be symmetrical (e.g., about a horizontal place, such as the intersection plane of FIG. 7).

The movable arms 104a-b can be closer to each other when in the closed or inward position, and can be further apart from each other when in the open or outward position. The right movable arm 104a can be closer to the right stationary arm 106a when in the open or outward position than when in the closed or inward position. The left movable arm 104b can be closer to the left stationary arm 106b when in the open or outward position than when in the closed or inward position. The right movable arm 104a can be closer to the left stationary arm 106b when in the closed or inward position than when in the open or outward position. The left movable arm 104b can be closer to the right stationary arm 106b when in the closed or inward position than when in the open or outward position. The direction of movement of the movable arms 104a-b can be in a direction that is substantially parallel to the direction that the stationary arms 106a-b extend away from the main body 102. This can facilitate the stabilizing of the mount 100 while force is applied to move the movable arms 104a-b.

The mounts 100 shown and described can be modified in various ways. In some embodiments, the mount 100 can have only one movable arm. For example, one of the arms 104a or 104b can be stationary, while the other of the arms 104b and 104a can move similar to other embodiments described herein. In some cases, one of the arms 104a-b can be omitted. For example, a single movable arm 104a or 104b can press the mobile electronic device 152 against the main body 102 or other structure to hold it in place. The mount 100 can have a single stationary arm 106a or 106b. For example, in the example of FIG. 11, the user only uses the right stationary arm 106a for one-handed insertion and/or removal of the mobile electronic device 152, and the left stationary arm 106b can be omitted or removed. In some cases, stationary arms 106a-b can be on both sides so that the user can operate the mount 100 from the left or right side. In some cases, a single stationary arm 106a or 106b can be used, and the mount 100 can be sufficiently symmetrical that it can be used in an upright configuration (e.g., with the single stationary arm 106a on the right side) and in an inverted configuration (e.g., with the same single stationary arm 106b on the left side). As discussed herein, the mount 100 can have two stationary arms 106a-b, which can be independently replaceably detachable. In some cases, a single stationary arm 106 can be provided, and the mount can have two attachment locations for alternatively attaching the single stationary arm 106 on either the left or right side. Each of the embodiments and recitations that discuss a pair of movable arms, or a pair of stationary arms, can instead use a single movable arm 104 and/or a single stationary arm 106. In some embodiments, the mount 100 can have two movable arms 104a-b, which can be independently movable. For example, the rack and pinion coupling can be omitted.

The mount 100 can be positioned in any orientation, but the directions (e.g., front, back, forward, top, bottom, right, left, etc.) or used relative to the orientations shown in the illustrations provided herein. The features of the illustrated embodiments are not necessarily shown to scale, but the dimensions that are shown are contemplated to be part of the disclosure, as example embodiments.

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

The following is claimed:

1. A mount for holding a mobile electronic device, the mount comprising:
    a main body;
    a vent mount configured to attach the main body to a vent of an automobile;
    a wireless charging antenna inside the main body;
    a right movable arm on a right side of the main body, wherein the right movable arm comprises an inwardly facing side and an outwardly facing side;
    a left movable arm on a left side of the main body, wherein the left movable arm comprises an inwardly facing side and an outwardly facing side, wherein the right and left movable arms are movable between an inward configuration and an outward configuration, wherein the right movable arm and the left movable arm are closer to each other in the inward configuration than in the outward configuration, wherein the left and right movable arms are configured to hold a mobile electronic device and to position the mobile electronic device relative to the wireless charging antenna so that the wireless charging antenna is operable to wireless charge the mobile electronic device;
    a biasing mechanism for biasing the right and left movable arms towards the inward configuration;
    a right stationary arm extending from the right side of the main body to a position to the right of the right movable arm, wherein the right stationary arm comprises an inwardly facing side and an outwardly facing side; and
    a left stationary arm extending from the left side of the main body to a position to the left of the left movable arm, wherein the left stationary arm comprises an inwardly facing side and an outwardly facing side;
    wherein, when transitioning from the inward configuration to the outward configuration, the right movable arm moves towards the right stationary arm and the left movable arm moves towards the left stationary arm;
    wherein a distance of the range of motion of the right movable arm between the inward configuration and the outward configuration is greater than a distance between the outwardly facing side of the right stationary arm and the outwardly facing side of the right movable arm in the outward configuration; and
    wherein a distance of the range of motion of the left movable arm between the inward configuration and the outward configuration is greater than a distance between the outwardly facing side of the left stationary arm and the outwardly facing side of the left movable arm in the outward configuration.

2. The mount of claim 1, further comprising:
    a pinion gear with teeth;
    a right rack coupled to the right movable arm, the right rack having teeth configured to engage the teeth of the pinion gear; and
    a left rack coupled to the left movable arm, the left rack having teeth configured to engage the teeth of the pinion gear;
    wherein movement of the right movable arm or the left movable arm causes the pinion gear to rotate to thereby cause the other of the left movable arm or the right movable arm to also move.

3. The mount of claim 1, wherein the right and left stationary arms are replaceably detachable from the main body.

4. The mount of claim 1, wherein the vent mount is replaceably detachable from the main body.

5. The mount of claim 1, wherein the vent mount has four blades with a first slot configured to orient the mount in a first orientation and a second slot to orient the mount in a second configuration that is offset from the first orientation by about 80 degrees to about 100 degrees.

6. The mount of claim 1, further comprising one or more air vents for cooling an interior of the main body.

7. The mount of claim 1, wherein a linear line extends through the right stationary arm, the right movable arm, the left movable arm, and the left stationary arm when the right and left movable arms are in the inward configuration and when the right and left arms are in the outward configuration.

8. The mount of claim 1, wherein the right and left movable arms move in a direction that is substantially parallel to the direction that the right and left stationary arms extend away from the main body.

9. The mount of claim 1, comprising:
    a first pad on the outwardly facing side of the right stationary arm; and
    a second pad on the outwardly facing side of the left stationary arm.

10. The mount of claim 1, wherein:
    the right stationary arm includes a first portion, a second portion, and an end portion, wherein the first portion extends outwardly from the main body, wherein the second portion extends forward between the first portion and the end portion, and wherein the first portion and the second portion are thinner than the right movable arm;

the left stationary arm includes a first portion, a second portion, and an end portion, wherein the first portion extends outwardly from the main body, wherein the second portion extends forward between the first portion and the end portion, and wherein the first portion and the second portion are thinner than the left movable arm.

11. The mount of claim 1, wherein:
a distance from the inwardly facing side of the right stationary arm to the inwardly facing side of the right movable arm is greater than a distance from the outwardly facing side of the right stationary arm to the outwardly facing side of the right movable arm; and
a distance from the inwardly facing side of the left stationary arm to the inwardly facing side of the left movable arm is greater than a distance from the outwardly facing side of the left stationary arm to the outwardly facing side of the left movable arm.

12. A mount for holding a mobile electronic device, the mount comprising:
a main body;
at least one stationary arm that comprises an inwardly facing side and an outwardly facing side; and
at least one movable arm that comprises an inwardly facing side and an outwardly facing side, wherein the movable arm is biased towards a direction away from the stationary arm, and wherein a distance from the inwardly facing side of the stationary arm to the inwardly facing side of the movable arm is greater than a distance from the outwardly facing side of the stationary arm to the outwardly facing side of the movable arm.

13. The mount of claim 12, further comprising a vent mount configured to couple the main body to a vent blade.

14. The mount of claim 12, further comprising a wireless charging antenna inside the main body.

15. The mount of claim 12, wherein the at least one movable arm comprises a pair of movable arms, wherein the at least one stationary arm comprises a pair of stationary arms, and wherein the pair of movable arms are positioned between the pair of stationary arms.

16. The mount of claim 15, wherein a linear line extends through the pair of movable arms and through the pair of stationary arms.

17. The mount of claim 15, further comprising a rack and pinion coupling mechanism that couples the pair of movable arms so that the they move concurrently but in opposite directions.

18. The mount of claim 15, wherein the pair of stationary arms extend outward from the main body along corresponding first and second directions, wherein the pair of movable arms move in corresponding third and fourth directions, and wherein the first, second, third, and fourth directions are substantially parallel.

19. The mount of claim 12, comprising a pad on the outwardly facing side of the stationary arm.

20. The mount of claim 12, wherein the stationary arm includes a first portion, a second portion, and an end portion, wherein the first portion extends outwardly from the main body, wherein the second portion extends forward between the first portion and the end portion, and wherein the first portion and the second portion are thinner than the movable arm.

21. The mount of claim 12, wherein the movable arm has a range of motion between an inward position and an outward position, wherein a distance of the range of motion is greater than a distance between the outwardly facing side of the stationary arm and the outwardly facing side of the movable arm in the outward position.

22. A method of using a mount with a mobile electronic device, the method comprising:
accessing a mobile electronic device;
accessing a mount configured to hold the mobile electronic device, the mount comprising:
a pair of movable arms that are movable between an inward position and an outward position, wherein the pair of movable arms are biased towards the inward position, wherein each of the pair of movable arms has an inwardly facing side and an outwardly facing side; and
a pair of stationary arms positioned outward of the movable arms, wherein each of the pair of stationary arms has an inwardly facing side and an outwardly facing side;
pinching one of the pair of movable arms and one of the stationary arms towards each other to move the pair of movable arms towards the outward position by:
pressing on a mobile electronic device that is abutted against the inwardly facing side of the movable arm with a finger or thumb of a hand to drive the movable arm towards the stationary arm; and
pressing on the outwardly facing side of the stationary arm with a finger or thumb of the same hand to stabilize the mount as the movable arm is driven towards the stationary arm;
inserting the mobile electronic device between the pair of movable arms or removing the mobile electronic device from between the pair of movable arms; and
releasing the forces on the one of the pair of movable arms and the one of the stationary arms so that the pair of movable arms move towards the inward position.

23. The method of claim 22, wherein movement of the one of the pair of movable arms causes the other of the pair of movable arms to move away from the one of the stationary arms.

24. The method of claim 22, wherein the mount is coupled to a vent blade of an automobile.

25. The method of claim 22, wherein a straight line extends through the pair of movable arms and through the pair of stationary arms.

26. The method of claim 22, wherein the mount comprises pads on the outwardly facing sides the pair of stationary arms.

27. The method of claim 22, wherein each of the pair of stationary arms includes a first portion, a second portion, and an end portion, wherein the first portion extends outwardly from a main body of the mount, wherein the second portion extends forward between the first portion and the end portion, and wherein the first portion and the second portion are thinner than the movable arms.

28. The method of claim 22, wherein a distance from the inwardly facing side of the stationary arm to the inwardly facing side of the movable arm is greater than a distance from the outwardly facing side of the stationary arm to the outwardly facing side of the movable arm.

29. The method of claim 22, wherein the movable arm has a range of motion between the inward position and the outward position, wherein a distance of the range of motion is greater than a distance between the outwardly facing side of the stationary arm and the outwardly facing side of the movable arm in the outward position.

* * * * *